(12) United States Patent
Fujimoto et al.

(10) Patent No.: US 9,975,180 B2
(45) Date of Patent: May 22, 2018

(54) MACHINE TOOL

(71) Applicant: DMG MORI CO., LTD., Yamatokoriyama-shi (JP)

(72) Inventors: Koji Fujimoto, Yamatokoriyama (JP); Tatsuhiko Kuriya, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 191 days.

(21) Appl. No.: 14/823,164

(22) Filed: Aug. 11, 2015

(65) Prior Publication Data

US 2016/0067782 A1 Mar. 10, 2016

(30) Foreign Application Priority Data

Sep. 8, 2014 (JP) ................................. 2014-182270

(51) Int. Cl.
| | |
|---|---|
| *B23B 3/06* | (2006.01) |
| *B23Q 3/155* | (2006.01) |
| *B23Q 39/02* | (2006.01) |
| *B23B 3/16* | (2006.01) |

(Continued)

(52) U.S. Cl.
CPC .......... *B23B 3/065* (2013.01); *B23Q 3/15513* (2013.01); *B23Q 3/15573* (2013.01); *B23Q 39/027* (2013.01); *B23B 3/165* (2013.01); *B23B 3/168* (2013.01); *B23Q 3/15713* (2013.01);

(Continued)

(58) Field of Classification Search
CPC ............ B23Q 3/15513; B23Q 3/15573; B23Q 3/15713; B23Q 11/0046; B23B 31/24; B23B 3/065; B23B 3/162; B23B 3/165; B23B 3/168; B23B 11/00; Y10T 483/15;

(Continued)

(56) References Cited

U.S. PATENT DOCUMENTS

| | | | | | |
|---|---|---|---|---|---|
| 4,320,999 | A | * | 3/1982 | Briese ................ | B23Q 11/1007 407/11 |
| 4,485,595 | A | * | 12/1984 | Minamiyama .......... | B24B 41/04 451/26 |

(Continued)

FOREIGN PATENT DOCUMENTS

| | | |
|---|---|---|
| JP | 60-123243 | 7/1985 |
| JP | 60-117001 U | 8/1985 |
| JP | 6-238539 | 8/1994 |

*Primary Examiner* — Daniel Howell
*Assistant Examiner* — Yasir Diab
(74) *Attorney, Agent, or Firm* — Oblon, McClelland, Maier & Neustadt, L.L.P.

(57) ABSTRACT

A machine tool can perform a turning process using a fixed tool and a milling process using a rotating tool. The machine tool includes: a tool spindle having an air supply portion, for rotating the rotating tool; a lower tool rest for mounting a plurality of fixed tools thereon; a tool holder having a tapered surface restraining a tool, and attached to the lower tool rest, for detachably holding the tool; an automatic tool changer; and a special tool mounted on the tool spindle, into which the air is introduced from the air supply portion. When the tool is automatically changed by the automatic tool changer, the special tool mounted on the tool spindle is coupled to the tool holder, and the air from the air supply portion is supplied to the tapered surface through the special tool.

3 Claims, 5 Drawing Sheets

(51) Int. Cl.
*B23Q 3/157* (2006.01)
*B23Q 11/00* (2006.01)

(52) U.S. Cl.
CPC .... *B23Q 11/0046* (2013.01); *B23Q 2220/002* (2013.01); *B23Q 2230/002* (2013.01)

(58) Field of Classification Search
CPC ..... Y10T 483/1705; Y10T 409/309464; Y10T 29/5114; Y10T 29/5109
See application file for complete search history.

(56) References Cited

U.S. PATENT DOCUMENTS

| | | | | |
|---|---|---|---|---|
| 4,601,094 A | * | 7/1986 | Myers | B23B 3/16 483/24 |
| 4,713,875 A | * | 12/1987 | Dormehl | B23Q 3/15513 483/25 |
| 4,777,713 A | * | 10/1988 | Kitamura | B23B 3/065 29/27 C |
| 4,785,525 A | * | 11/1988 | Ishida | B23B 3/161 29/27 R |
| 4,951,376 A | * | 8/1990 | Grund | B23B 3/06 29/27 C |
| 5,327,979 A | * | 7/1994 | Du | B23Q 11/103 173/199 |
| 6,079,090 A | * | 6/2000 | Ongaro | B23F 17/006 29/27 C |
| 7,784,162 B2 | * | 8/2010 | Hessbruggen | B23B 3/168 29/27 C |
| 2003/0134731 A1 | * | 7/2003 | Komine | B23Q 1/623 483/27 |
| 2005/0049126 A1 | * | 3/2005 | Everson | B23Q 3/15513 483/47 |
| 2011/0107573 A1 | * | 5/2011 | Fujioka | B23B 29/04 29/27 A |

* cited by examiner

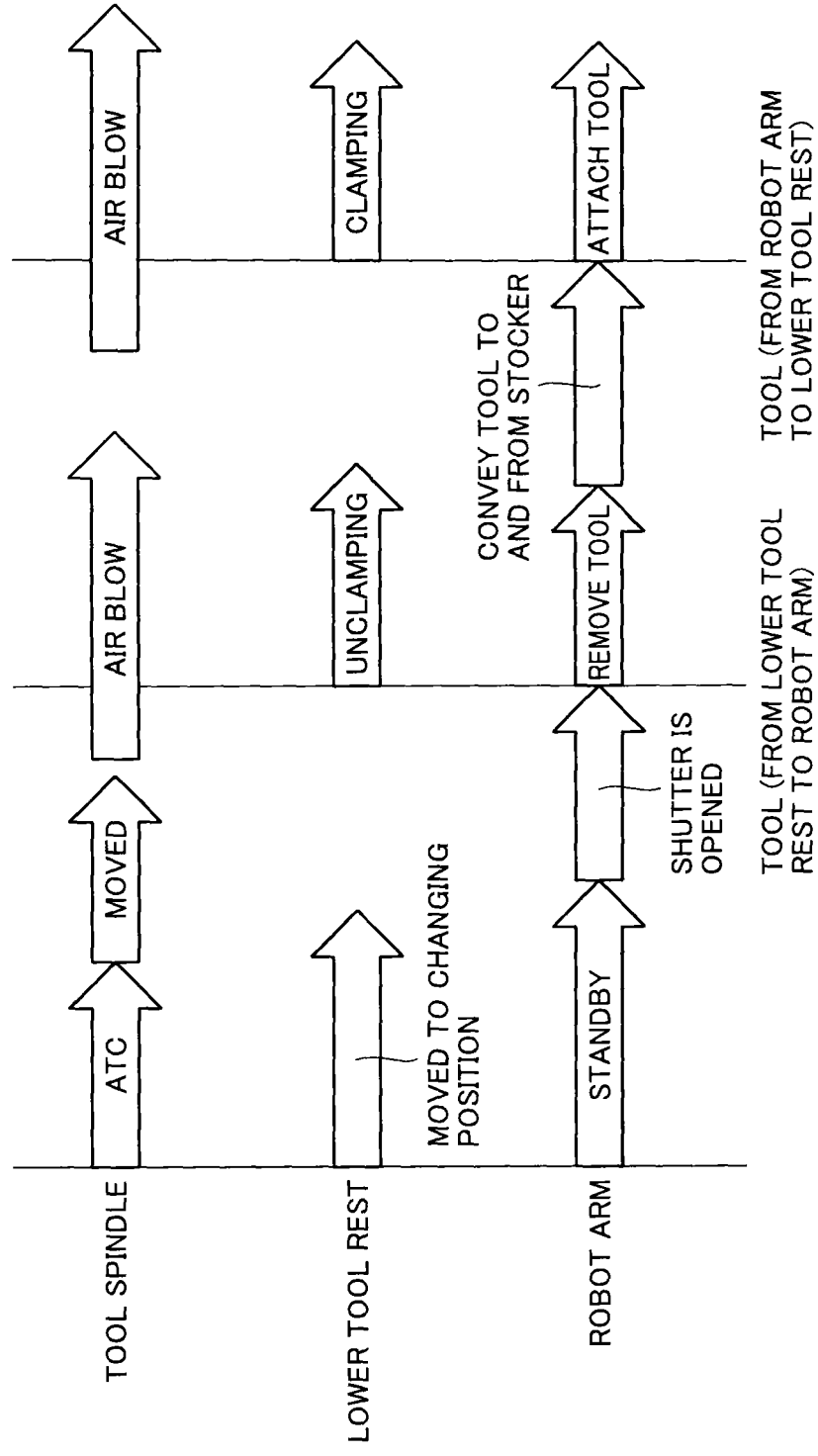

MACHINE TOOL

BACKGROUND OF THE INVENTION

Field of the Invention

The present invention generally relates to a machine tool, and more particularly to a machine tool capable of performing a turning process using a fixed tool and a milling process using a rotating tool.

Description of the Background Art

As to conventional machine tools, for example, Japanese Utility Model Laying-Open No. 60-117001 discloses a numerically controlled lathe equipped with an automatic tool changer (ATC), which aims at simplifying the operation of the ATC and shortening the time required to change a tool (PTD 1).

The numerically controlled lathe disclosed in PTD 1 includes an automatic tool changer for automatically changing a tool between a turret on a tool rest and a tool magazine.

Further, Japanese Patent Laying-Open No. 60-123243 discloses a machine tool equipped with a tool changer, which aims at providing cleaning means that allows easy cleaning of each guide surface when automatically changing a tool block in a linear reciprocating motion, and that has a simple structure but still reliably operates, and also allows further swift cleaning (PTD 2).

The machine tool disclosed in PTD 2 includes changing means for automatically changing a tool between a turret head on a tool rest and a tool magazine.

Furthermore, Japanese Patent Laying-Open No. 06-238539 discloses a tool changer which aims at attaching/detaching a tool unit to/from a tool holder attached to a turret, in parallel to the central axis line of the turret or at a right angle to this central axis line (PTD 3).

In the tool changer disclosed in PTD 3, near the turret, an X-Z stage is provided for holding a drive box so as to be movable in directions at a right angle to and in parallel to the central axis line of the turret. A tool changing box having a tool hand for gripping the tool unit is swivelably provided to the drive box.

SUMMARY OF THE INVENTION

As disclosed in the above-described PTD 1 to PTD 3, machine tools including an automatic tool changer for automatically changing a tool held in a tool holder on a tool rest (turret) are known.

In such a machine tool, in order to prevent entrance of foreign substances such as chips into a gap between a tool restraining surface in the tool holder and the tool when the tool is automatically changed, it is necessary to perform air blow on the restraining surface. However, it is difficult to provide a mechanism for supplying the air to the tool holder on the tool rest side, because the tool rest incorporates various mechanisms such as a mechanism for performing swivel indexing of the tool.

Accordingly, an object of the present invention is to solve the aforementioned problem, and to provide a machine tool capable of supplying the air to a tool holder on a tool rest when a tool is automatically changed by an automatic tool changer.

A machine tool according to the present invention is a machine tool capable of performing a turning process using a fixed tool and a milling process using a rotating tool. The machine tool includes: a tool spindle having an air supply portion supplying air, for rotating the rotating tool; a tool rest for mounting a plurality of fixed tools thereon; a tool holder having a restraining surface restraining a tool, and attached to the tool rest, for detachably holding the tool; an automatic tool changer for automatically changing the tool held in the tool holder; and a special tool mounted on the tool spindle, into which the air is introduced from the air supply portion. When the tool is automatically changed by the automatic tool changer, the special tool mounted on the tool spindle is coupled to the tool holder, and the air from the air supply portion is supplied to the restraining surface through the special tool.

According to the machine tool configured as described above, when the tool is automatically changed by the automatic tool changer, the air from the air supply portion of the tool spindle can be supplied to the tool holder on the tool rest, by coupling the special tool mounted on the tool spindle to the tool holder attached to the tool rest.

Preferably, the tool holder further has an operating element operating in association with holding of the tool in the tool holder. The special tool has a sensor portion which detects operation of the operating element when the tool is automatically changed by the automatic tool changer.

According to the machine tool configured as described above, by providing the sensor portion to the special tool, holding of the tool in the tool holder can also be confirmed simultaneously.

Preferably, the automatic tool changer has a gripping portion gripping the tool. When the tool is automatically changed by the automatic tool changer, the special tool is positioned on a side opposite to the gripping portion with the tool holder sandwiched therebetween.

According to the machine tool configured as described above, interference between the special tool and the gripping portion can be easily avoided when the tool is automatically changed by the automatic tool changer.

As described above, according to the present invention, a machine tool capable of supplying the air to a tool holder on a tool rest when a tool is automatically changed by an automatic tool changer can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a view showing an operation flow of the tool spindle and the lower tool rest when the tool mounted on the lower tool rest is automatically changed in the machine tool in FIG. 1.

DESCRIPTION OF THE PREFERRED EMBODIMENTS

Figure 1:
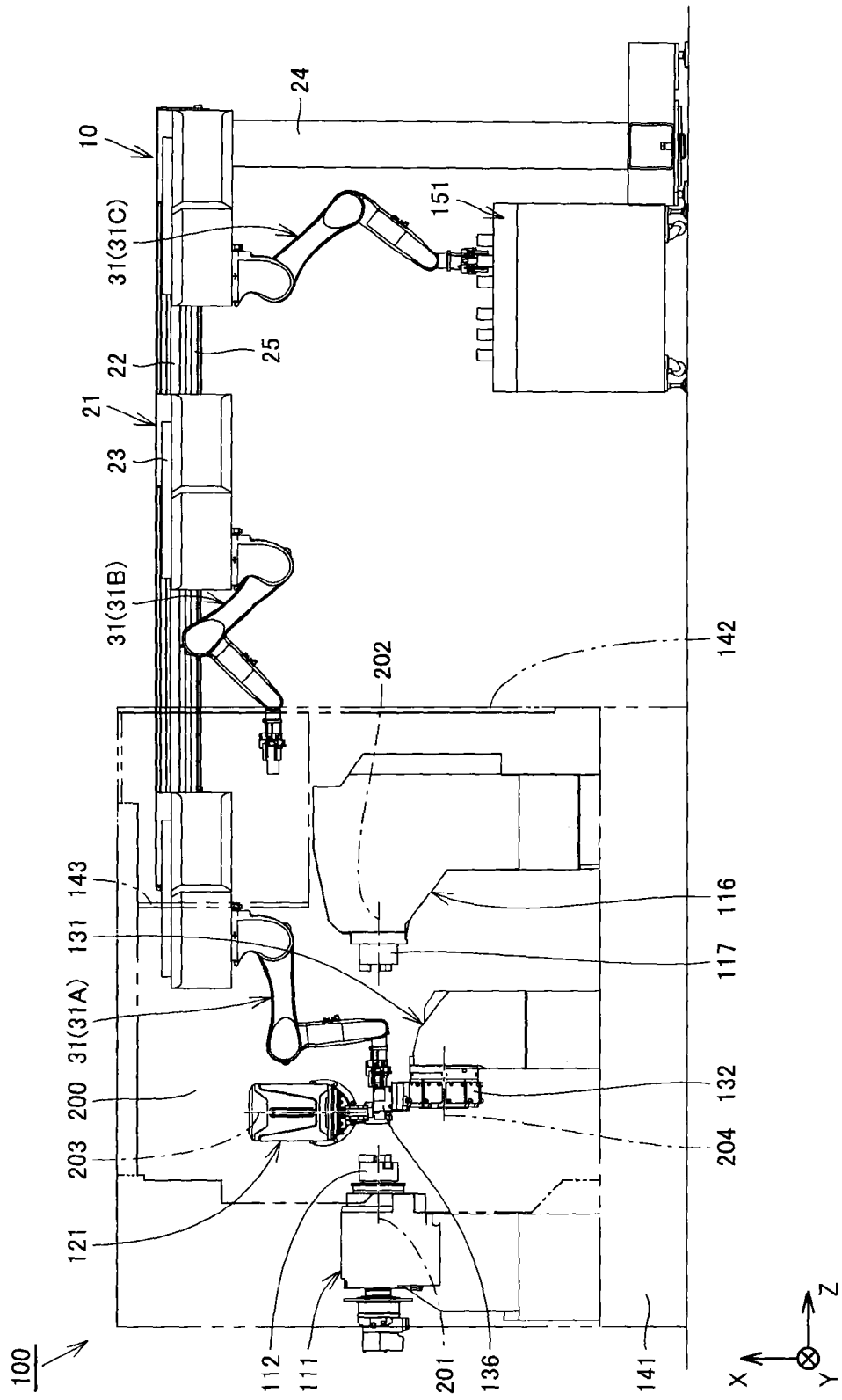
FIG. 1 is a front view showing a machine tool in an embodiment of the present invention.

An embodiment of the present invention will be described with reference to the drawings. In the drawings referred in the following, the same or corresponding components are designated by the same reference characters.

FIG. 1 is a front view showing a machine tool in an embodiment of the present invention. FIG. 1 includes a see-through view of a cover body exhibiting an external appearance of the machine tool, which shows the inside of the machine tool.

Referring to FIG. 1, a machine tool 100 is a composite process machine having a turning function using a fixed tool and a milling function using a rotating tool. First, the entire structure of machine tool 100 will be described. Machine tool 100 has a bed 141, a first headstock 111, a second headstock 116, a tool spindle 121, and a lower tool rest 131.

Bed 141 is a base member for supporting first headstock 111, second headstock 116, tool spindle 121, and lower tool rest 131, and is placed on an installation surface in a factory or the like.

First headstock 111 and second headstock 116 are provided to face each other in the Z-axis direction extending in the horizontal direction. First headstock 111 and second headstock 116 have a spindle 112 and a spindle 117, respectively, for rotating a workpiece during a turning process using a fixed tool. Spindle 112 is provided so as to be rotatable about a central axis 201 parallel to the Z-axis, while spindle 117 is provided so as to be rotatable about a central axis 202 parallel to the Z-axis. Spindle 112 and spindle 117 are each provided with a chuck mechanism for detachably holding the workpiece.

Tool spindle (an upper tool rest) 121 rotates a rotating tool during a milling process using the rotating tool. Tool spindle 121 is provided so as to be rotatable about a central axis 203 parallel to the X-axis extending in the vertical direction. Tool spindle 121 is provided with a clamping mechanism 122 for detachably holding the rotating tool.

Tool spindle 121 is supported on bed 141 by a column and the like not shown. Tool spindle 121 is provided so as to be movable in the X-axis direction, in the Y-axis direction extending in the horizontal direction and orthogonal to the Z-axis direction, and in the Z-axis direction, by various types of feed mechanisms, guide mechanisms, servo motors, and the like provided to the column and the like. The machining position by the rotating tool mounted on tool spindle 121 is moved in a three-dimensional manner. Tool spindle 121 is provided so as to be also swivelable about a central axis parallel to the Y-axis.

Tool spindle 121 has an air supply portion (not shown) which can supply air. As a representative example, the air supply portion is provided as a mechanism for supplying the air to the rotating tool mounted on tool spindle 121 (center-through air blow). In this case, the air from an air supply source such as a compressor placed separately from machine tool 100 is supplied to the rotating tool through tool spindle 121.

On lower tool rest 131, a plurality of fixed tools for the turning process are mounted. Lower tool rest 131, which has a so-called turret type, is equipped with the plurality of fixed tools in a radial manner, and performs swivel indexing.

More specifically, lower tool rest 131 has a swivel portion 132. Swivel portion 132 is provided so as to be swivelable about a central axis 204 parallel to the Z-axis. At each of positions (10 positions in the present embodiment) disposed at intervals in the circumferential direction about central axis 204, a tool holder for holding a fixed tool is attached. Swivel portion 132 swivels about central axis 204, thereby causing the fixed tools held in the tool holders to move in the circumferential direction, so that the fixed tool used for the turning process is indexed.

Lower tool rest 131 is supported on bed 141 by a saddle and the like not shown. Lower tool rest 131 is provided so as to be movable in the X-axis direction and in the Z-axis direction, by various types of feed mechanisms, guide mechanisms, servo motors and the like provided to the saddle and the like.

In the present embodiment, lower tool rest 131 incorporates a motor for rotating the rotating tool. The rotating force from the motor is transmitted to the rotating tool held in the tool holder, so that the rotating tool can be used in lower tool rest 131.

Figure 2:
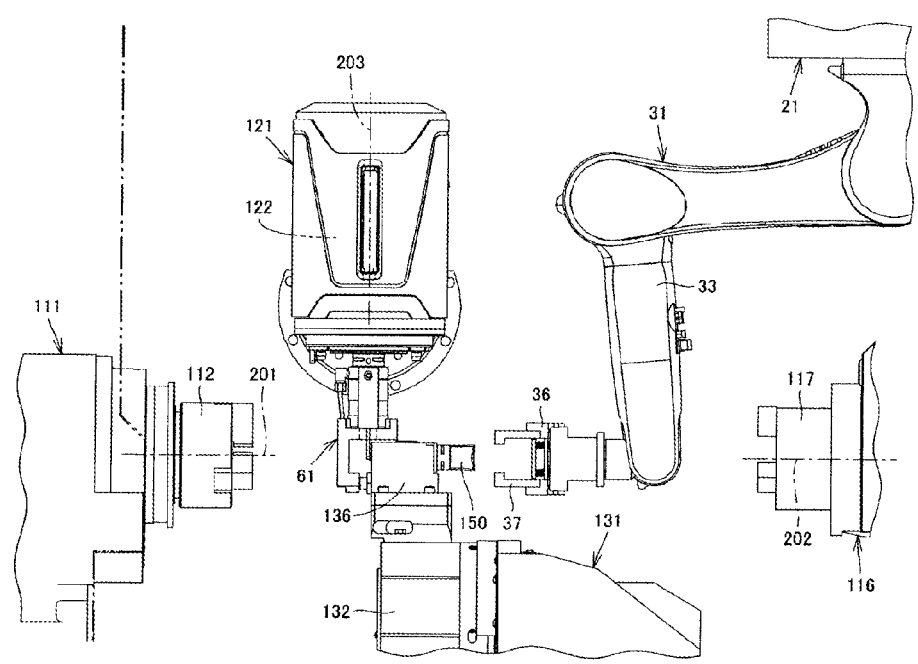
FIG. 2 is a side view showing the state within a machining area when a tool mounted on a lower tool rest is automatically changed in the machine tool in FIG. 1.

FIG. 2 is a side view showing the state within a machining area when a tool mounted on the lower tool rest is automatically changed in the machine tool in FIG. 1.

Referring to FIGS. 1 and 2, machine tool 100 has an automatic tool changer (ATC) 10 and a tool stocker 151. Automatic tool changer 10 automatically changes a tool mounted on lower tool rest 131. Tool stocker 151 is provided as a tool housing portion for housing replacement tools to be mounted on lower tool rest 131.

Machine tool 100 has a tool holder (for ATC) 136. Tool holder 136 is attached to lower tool rest 131 (swivel portion 132). Tool holder 136 incorporates a clamping mechanism for detachably holding a tool. Automatic tool changer 10 automatically replaces a tool held in tool holder 136 among a plurality of tools mounted on lower tool rest 131, with a tool housed in tool stocker 151. When a tool is mounted on lower tool rest 131, the tool is inserted into tool holder 136 from a direction parallel to the Z-axis.

Although not shown in FIG. 1, machine tool 100 has, around first headstock 111, an automatic tool changer for automatically changing the tool mounted on tool spindle 121, and a tool magazine for housing replacement tools to be mounted on tool spindle 121.

Machine tool 100 has a side cover 142. Side cover 142 is provided on a side opposite to first headstock 111 relative to second headstock 116. Side cover 142 provides separation between the inside and the outside of a machining area 200. Side cover 142 is provided with a shutter 143 that can be opened and closed. Tool stocker 151 is provided outside the machining area.

Automatic tool changer 10 has a robot arm 31 and a movement mechanism portion 21. Robot arm 31 is provided so as to be capable of gripping a tool. Movement mechanism portion 21 moves robot arm 31 between the inside and the outside of machining area 200. Movement mechanism portion 21 moves robot arm 31 in the range of a tool changing position 31A within the machining area, a standby position 31B outside the machining area, and a stocker position 31C outside the machining area.

Movement mechanism portion 21 has a base member 23, a linear guide 22, a rack and pinion 25, a servo motor (not shown), and a support pillar 24, as a mechanism for causing robot arm 31 to linearly reciprocate.

Base member 23 is made of a plate material, and has robot arm 31 and the servo motor attached thereto. Linear guide 22 and rack and pinion 25 are provided at a certain height from the installation surface for machine tool 100, by support pillar 24. Linear guide 22 is provided as a guide mechanism for guiding base member 23 in a direction parallel to the Z-axis. Rack and pinion 25 converts the rotation output from the servo motor into linear motion, thereby moving base member 23 in the Z-axis direction.

Robot arm 31 has an arm portion 33 and a gripping portion 36. Arm portion 33 is formed to extend from movement mechanism portion 21 toward gripping portion 36, in the shape of an arm. Arm portion 33 includes a plurality of movable portions coupled with each other via pivot axes. In the present embodiment, robot arm 31 is provided as a robot arm capable of controlling six axes (three pivot axes and three rotation axes) independently.

Gripping portion 36 is provided at a tip of arm portion 33. Gripping portion 36 has a claw portion 37. Claw portion 37 has a claw shape which can engage a tool. Gripping portion 36 detachably grips the tool using claw portion 37.

Although FIG. 2 shows gripping portion 36 of a single-arm type capable of gripping one tool at a time, a gripping portion of a double-arm type capable of simultaneously gripping two tools may be provided to arm portion 33.

Movement of robot arm 31 when the tool mounted on lower tool rest 131 is automatically changed will be described.

During machining of a workpiece, robot arm 31 stands by at standby position 31B without gripping a tool. When the machining of the workpiece is finished and changing of the tool mounted on lower tool rest 131 is required, shutter 143 is brought into an open state. Robot arm 31 moves into the machining area through an opening appearing in side cover 142, and reaches tool changing position 31A with arm portion 33 being swung. Robot arm 31 further moves in the Z-axis direction (leftward in the drawing), and thereby grips the tool held in tool holder 136.

Robot arm 31 gripping the tool moves from tool changing position 31A to stocker position 31C (conveyance of the tool). By appropriately controlling the six axes of arm portion 33, robot arm 31 returns the tool removed from lower tool rest 131 back to tool stocker 151, and newly grips a replacement tool prepared in tool stocker 151.

Robot arm 31 moves from stocker position 31C to tool changing position 31A (conveyance of the tool). By the same movement as that at the time of removing the tool described above, robot arm 31 mounts the replacement tool on tool holder 136. Robot arm 31 moves from tool changing position 31A to standby position 31B, and shutter 143 is brought into a closed state. Thereby, changing of the tool by automatic tool changer 10 is completed.

Figure 3:
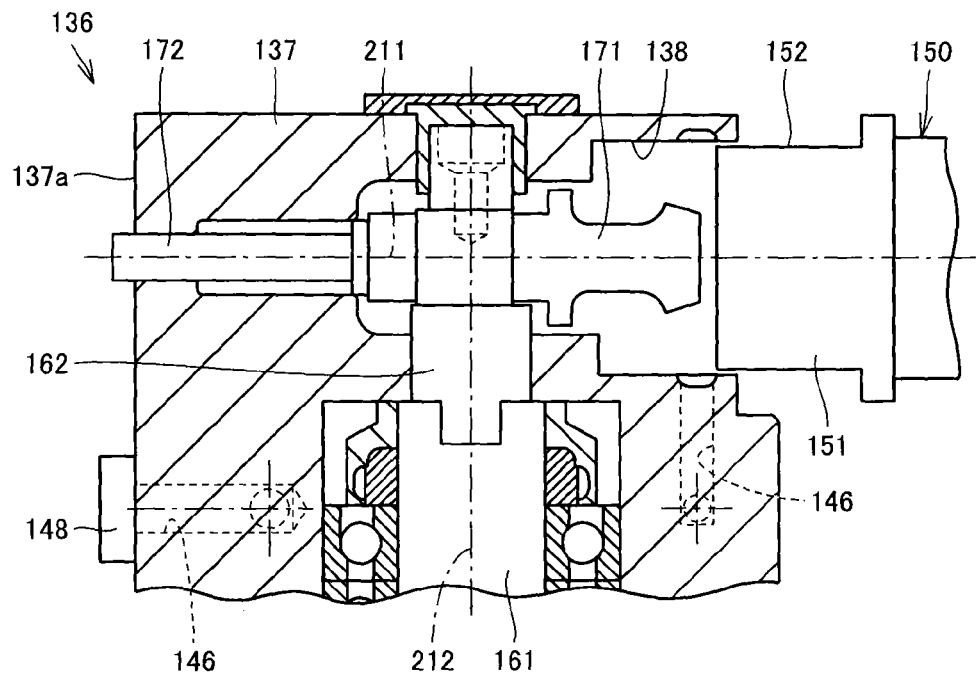
FIG. 3 is a cross sectional view showing a tool holder in FIG. 2.

FIG. 3 is a cross sectional view showing the tool holder in FIG. 2. Referring to FIG. 3, tool holder 136 has a block 137 incorporating the clamping mechanism for detachably holding a tool, and a clamp shaft 171, a rotating shaft 161, and a cam mechanism 162 constituting the clamping mechanism.

Block 137 is formed of a metal block. Block 137 has a side surface 137a. Side surface 137a is formed of a plane orthogonal to the Z-axis (an X-Y plane). Side surface 137a is provided, in the Z-axis direction, on a side facing first headstock 111, of first headstock 111 and second headstock 116.

Clamp shaft 171 extends in the shape of a shaft, along an axis line direction of a central axis 211 parallel to the Z-axis. Clamp shaft 171 has a shape which can engage a shank portion 151 of a tool 150. Clamp shaft 171 is provided so as to be slidable along the axis line direction of central axis 211.

Rotating shaft 161 extends in the shape of a shaft, along an axis line direction of a central axis 212 in a direction orthogonal to central axis 211. Rotating shaft 161 is provided so as to be rotatable about central axis 212. Rotating shaft 161 receives the rotating force from the motor not shown, and performs normal rotation and counter rotation about central axis 212.

Rotating shaft 161 is coupled to clamp shaft 171 via cam mechanism 162. Cam mechanism 162 converts rotational motion of rotating shaft 161 about central axis 212 into linear motion in the axis direction of central axis 211, and transmits the converted linear motion to clamp shaft 171.

When rotating shaft 161 performs normal rotation about central axis 212, clamp shaft 171 slides and moves leftward in the drawing. On this occasion, clamp shaft 171 engages shank portion 151 of tool 150 and draws in tool 150, and thereby tool 150 is clamped. On the other hand, when rotating shaft 161 performs counter rotation about central axis 212, clamp shaft 171 slides and moves rightward in the drawing. On this occasion, engagement between clamp shaft 171 and shank portion 151 of tool 150 is released, and thereby tool 150 is unclamped.

Block 137 has a tapered surface 138. Tapered surface 138 is provided as a restraining surface for restraining tool 150. Tapered surface 138 is provided so as to surround clamp shaft 171 from the outer circumference thereof. Tapered surface 138 has a tapered shape corresponding to a tapered surface 152 of shank portion 151. With tool 150 being held by tool holder 136, tapered surface 138 is in surface contact with tapered surface 152 of shank portion 151.

In block 137, an air passage 146 through which the air can flow is formed. One end portion of air passage 146 is opened in side surface 137a, and the other end portion of air passage 146 is opened in tapered surface 138.

A plug 148 is attached to block 137. Plug 148 is attached to an opening of air passage 146 in side surface 137a. Plug 148 has a shape to which a tool tip block 66 of a special tool 61 described later is connectable. By connecting tool tip block 66 to plug 148, air passage 146 on the block 137 side establishes communication with an air passage on the special tool 61 side.

Tool holder 136 further has a dog 172. Dog 172 is provided as an operating element operating in association with clamping of tool 150 in tool holder 136.

Dog 172 is connected to clamp shaft 171. Dog 172 has a shaft shape extending along the axis line direction of central axis 211. Dog 172 is provided so as to protrude from side surface 137a of block 137. When tool 150 is clamped, dog 172 slides and moves leftward in the drawing together with clamp shaft 171. Thereby, a protrusion length of dog 172 from side surface 137a increases.

Figure 4:
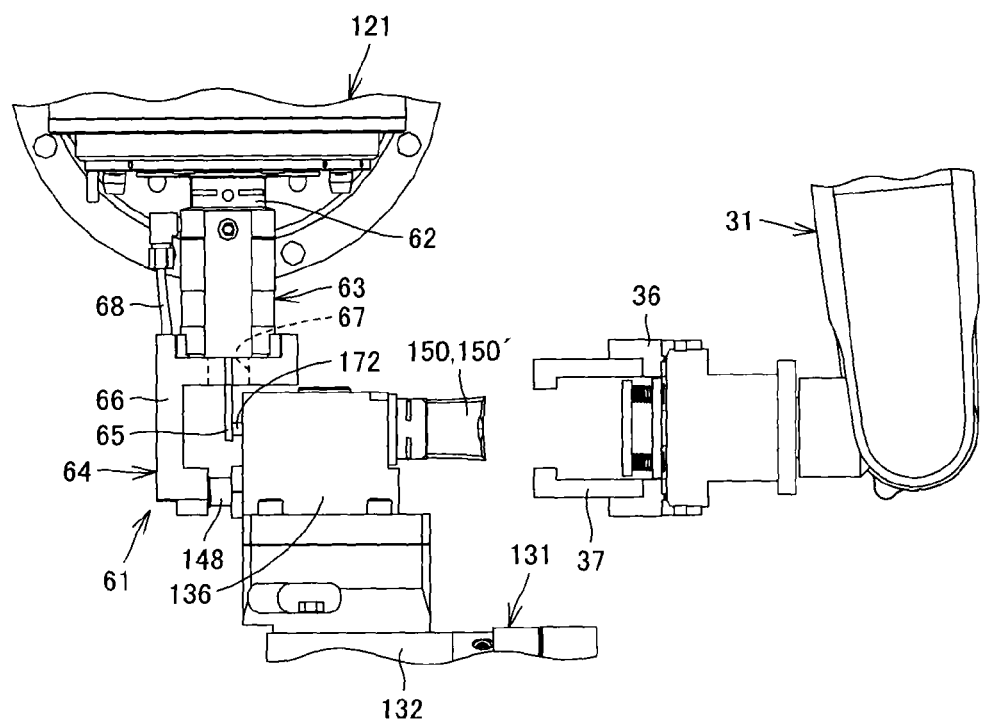
FIG. 4 is a side view showing first movement of a tool spindle and a robot arm when the tool mounted on the lower tool rest is automatically changed in the machine tool in FIG. 1.
Figure 5:
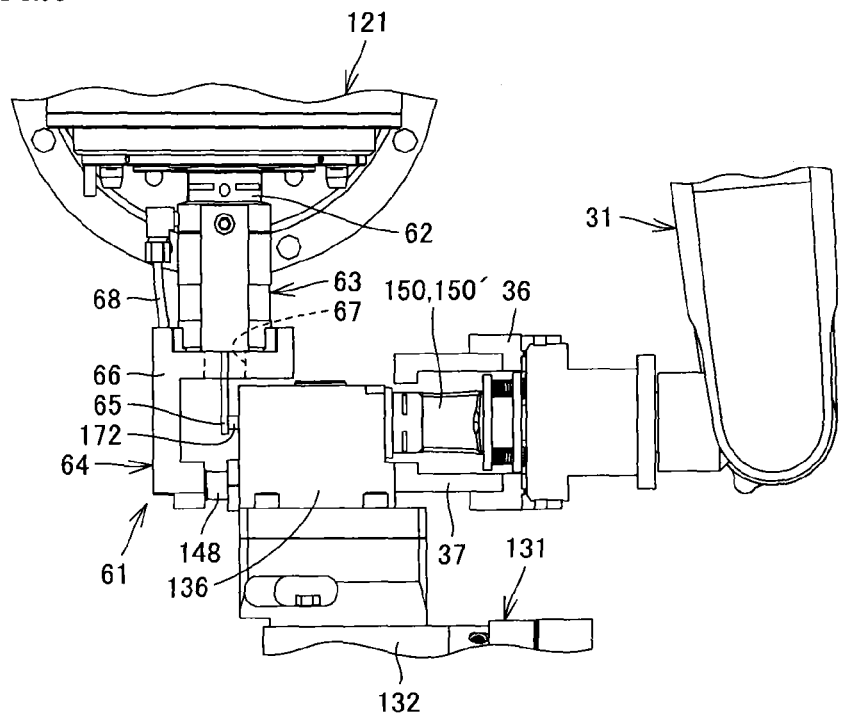
FIG. 5 is a side view showing second movement of the tool spindle and the robot arm when the tool mounted on the lower tool rest is automatically changed in the machine tool in FIG. 1.
Figure 6:
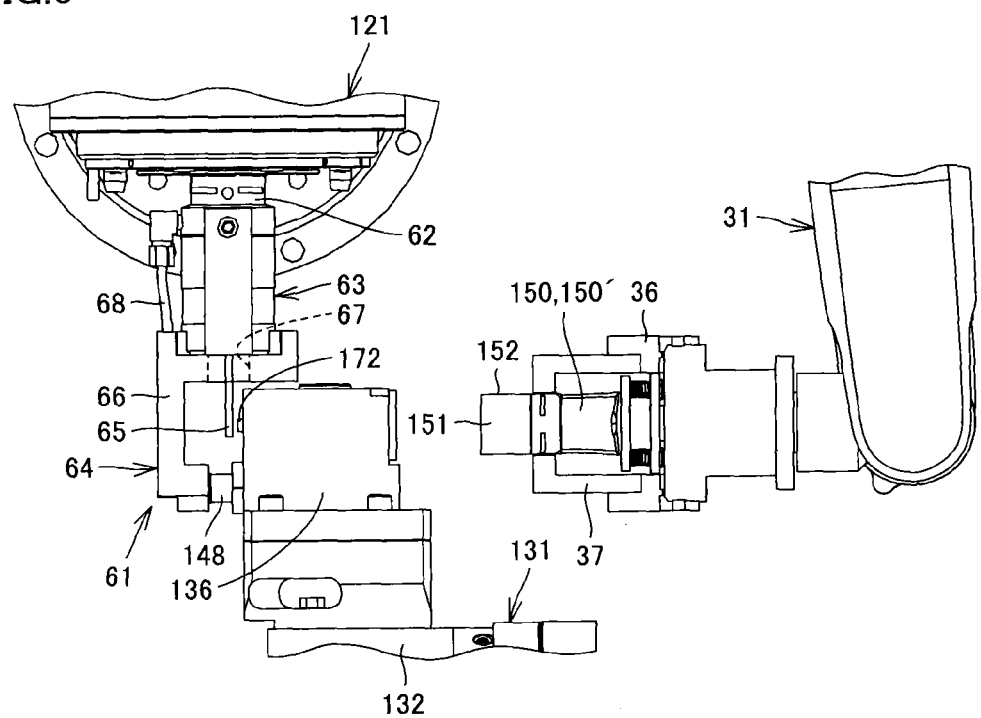
FIG. 6 is a side view showing third movement of the tool spindle and the robot arm when the tool mounted on the lower tool rest is automatically changed in the machine tool in FIG. 1.

FIGS. 4 to 6 each are a side view showing movement of the tool spindle and the robot arm when the tool mounted on the lower tool rest is automatically changed in the machine tool in FIG. 1.

Referring to FIGS. 4 to 6, machine tool 100 further has special tool 61. Special tool 61 is mounted on tool spindle 121 when tool 150 mounted on lower tool rest 131 is automatically changed by automatic tool changer 10.

Special tool 61 includes a shank portion 62, an air passage forming portion 64, and a sensor portion 63. Shank portion 62 is clamped by the clamping mechanism 122 provided to tool spindle 121. Air passage forming portion 64 and sensor portion 63 are provided to shank portion 62.

Air passage forming portion 64 forms an air passage through which the air can flow. Air passage forming portion 64 includes a pipe 68 and tool tip block 66. Pipe 68 is provided to guide the air introduced from the air supply portion (not shown) of tool spindle 121 into shank portion 62, to tool tip block 66.

Tool tip block 66 is formed of a metal block. Tool tip block 66 has a substantially L shape when viewed from the Y-axis direction. Tool tip block 66 is attached to a tip of special tool 61. In tool tip block 66, the air passage for guiding the air introduced from pipe 68 to air passage 146 (plug 148) of tool holder 136 is formed.

Sensor portion 63 detects operation of dog 172 when tool 150 mounted on lower tool rest 131 is changed. Sensor portion 63 has a probe 65. Probe 65 is provided as a sensing pin for dog 172 which is an object to be sensed. Probe 65 is provided to extend vertically downward. In tool tip block 66, a through-hole 67 for passing probe 65 therethrough is formed. Sensor portion 63 is a wireless sensor which wirelessly transmits a result detected by probe 65 (contact/non-contact with dog 172) to a receiver.

FIG. 7 is a view showing an operation flow of the tool spindle and the lower tool rest when the tool mounted on the lower tool rest is automatically changed in the machine tool in FIG. 1.

In machine tool 100 in the present embodiment, when the tool mounted on lower tool rest 131 is automatically changed, air blow to tapered surface 138 in tool holder 136 is performed and whether the tool is clamped or unclamped is confirmed, by coupling special tool 61 mounted on tool spindle 121 to tool holder 136. Hereinafter, an operation flow of tool spindle 121 and lower tool rest 131 in association with this auto tool changing will be described.

Referring to FIGS. 1, 4, and 7, robot arm 31 is moved from standby position 31B to tool changing position 31A. In this period, lower tool rest 131 is moved to a predetermined tool changing position. Auto tool changing of tool spindle 121 is performed by the automatic tool changer (not shown), to mount special tool 61 on tool spindle 121. Tool spindle 121 is moved while performing air supply from the air supply portion (not shown) of tool spindle 121 to special tool 61, to couple special tool 61 to tool holder 136 on lower tool rest 131 located at the tool changing position.

On this occasion, special tool 61 is positioned on a side opposite to gripping portion 36 with tool holder 136 sandwiched therebetween. Specifically, special tool 61 is positioned on the first headstock 111 side, and gripping portion 36 is positioned on the second headstock 116 side, with tool holder 136 sandwiched therebetween. Such a configuration can easily avoid interference between gripping portion 36 which moves towards tool 150 held in tool holder 136 and special tool 61 which moves towards tool holder 136, within the machining area.

When special tool 61 is coupled to tool holder 136, tool tip block 66 is connected to plug 148. The air from the air supply portion (not shown) of tool spindle 121 is supplied to air passage 146 of tool holder 136, through special tool 61 (shank portion 62, pipe 68, and tool tip block 66). Further, probe 65 provided to special tool 61 is positioned in contact with dog 172.

Referring to FIGS. 5 and 7, robot arm 31 is moved leftward in FIG. 5, to grip tool 150 held in tool holder 136 by gripping portion 36. Tool holder 136 unclamps tool 150 at timing when tool 150 is gripped by robot arm 31.

On this occasion, dog 172 slides and moves rightward in the drawing, and thus the protrusion length of dog 172 from side surface 137a decreases. Thereby, probe 65 loses contact with dog 172, and unclamping of tool 150 is confirmed in sensor portion 63.

Referring to FIGS. 6 and 7, robot arm 31 is moved rightward in FIG. 6, to remove tool 150 from tool holder 136.

On this occasion, an opening of air passage 146 in tapered surface 138 is released, and the air flowing from tool spindle 121 into air passage 146 is supplied to a gap between tapered surface 138 and tapered surface 152 of shank portion 151 of tool 150. This prevents foreign substances such as chips and a coolant from remaining on tapered surface 138. Thereafter, the air supply from the air supply portion (not shown) of tool spindle 121 to special tool 61 is suspended.

Referring to FIGS. 1, 6, and 7, robot arm 31 gripping a replacement tool 150' is moved from stocker position 31C to tool changing position 31A. The air supply from the air supply portion (not shown) of tool spindle 121 to special tool 61 is resumed.

Referring to FIGS. 5 and 7, robot arm 31 is moved leftward in FIG. 5, to insert replacement tool 150' into tool holder 136. The air flowing through air passage 146 is supplied to a gap between tapered surface 138 and tapered surface 152 of shank portion 151 of tool 150', in the same way as that at the time of removing tool 150.

Tool holder 136 clamps tool 150' at timing when tool 150' is inserted by robot arm 31. On this occasion, dog 172 slides and moves leftward in the drawing, and thus the protrusion length of dog 172 from side surface 137a increases. Thereby, probe 65 comes into contact with dog 172, and clamping of tool 150' is confirmed in sensor portion 63.

Referring to FIGS. 4 and 7, robot arm 31 is moved rightward in FIG. 4, to move gripping portion 36 away from tool 150'.

The structure of machine tool 100 in the embodiment of the present invention described above will be described in summary. Machine tool 100 in the present embodiment is a machine tool capable of performing a turning process using a fixed tool and a milling process using a rotating tool. Machine tool 100 includes: tool spindle 121 having an air supply portion supplying air, for rotating the rotating tool; lower tool rest 131 as a tool rest for mounting a plurality of fixed tools thereon; tool holder 136 having tapered surface 138 as a restraining surface restraining a tool, and attached to lower tool rest 131, for detachably holding the tool; automatic tool changer 10 for automatically changing the tool held in tool holder 136; and special tool 61 mounted on tool spindle 121, into which the air is introduced from the air supply portion. When the tool is automatically changed by automatic tool changer 10, special tool 61 mounted on tool spindle 121 is coupled to tool holder 136, and the air from the air supply portion is supplied to tapered surface 138 through special tool 61.

According to machine tool 100 in the embodiment of the present invention configured as described above, when the tool mounted on lower tool rest 131 is automatically changed, air supply from the tool spindle 121 side to the tool holder 136 side can be achieved by coupling special tool 61 held in tool spindle 121 to tool holder 136 on lower tool rest 131. In addition, since special tool 61 has sensor portion 63, clamping and unclamping of the tool in tool holder 136 can also be confirmed.

The present invention is applicable to a composite process machine capable of performing a turning process using a fixed tool and a milling process using a rotating tool.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

What is claimed is:

1. A machine tool capable of performing a turning process using a fixed tool and a milling process using a rotating tool, comprising:
   a tool spindle for rotating the rotating tool, the tool spindle having an air supply portion supplying air and a clamping mechanism for detachably holding the rotating tool;
   a tool rest for mounting a plurality of fixed tools thereon;
   a tool holder having a restraining surface restraining a tool, and attached to said tool rest, for detachably holding the tool;
   an automatic tool changer for automatically changing the tool released from said tool holder; and
   a special tool held on said tool spindle by the clamping mechanism of the tool spindle instead of the rotating tool, into which the air is introduced from said air supply portion,
   wherein when the tool is automatically changed by said automatic tool changer, said special tool held on said tool spindle is coupled to said tool holder, and the air from said air supply portion is supplied to said restraining surface through said special tool to prevent foreign substances from remaining on the restraining surface.

2. The machine tool according to claim 1, wherein
   said tool holder further has an operating element operating in association with holding of the tool in said tool holder, and
   said special tool has a sensor portion which detects operation of said operating element when the tool is automatically changed by said automatic tool changer.

3. The machine tool according to claim 1, wherein
   said automatic tool changer has a gripping portion gripping the tool, and
   when the tool is automatically changed by said automatic tool changer, said special tool is positioned on a side opposite to said gripping portion with said tool holder sandwiched therebetween.

* * * * *